July 21, 1964  J. B. KUCERA  3,141,444
TRAP FOR ANIMAL FLIES
Filed April 26, 1962
FIG.1
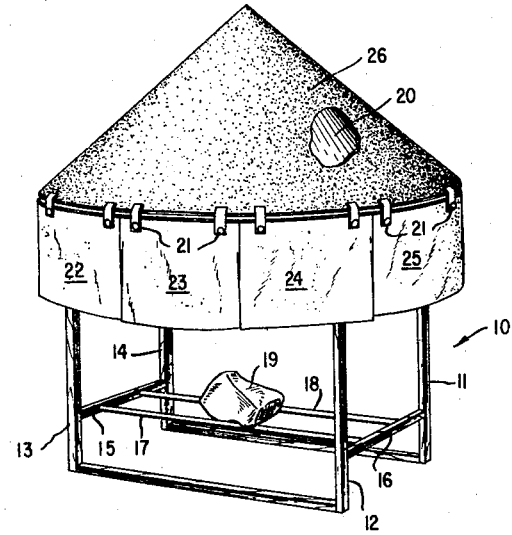
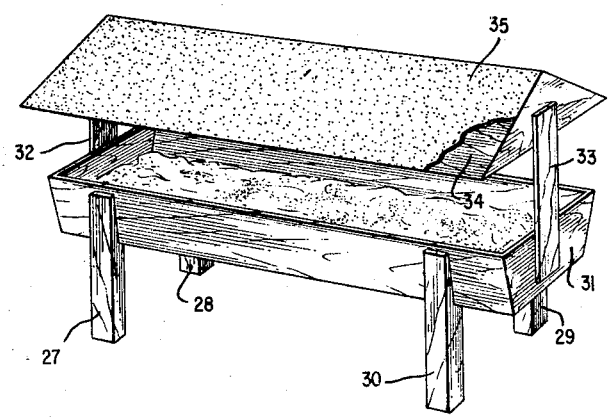
FIG. 2
INVENTOR.
JOSEPH B. KUCERA
BY
ATTORNEY

United States Patent Office 3,141,444
Patented July 21, 1964

3,141,444
TRAP FOR ANIMAL FLIES
Joseph B. Kucera, Traer, Iowa
Filed Apr. 26, 1962, Ser. No. 190,414
1 Claim. (Cl. 119—156)

This invention relates to fly traps for animals, primarily cattle and hogs, and is primarily directed to the proposition of taking advantage of the natural instincts of flies and other flying insects to entrap themselves.

The primary object of the invention is to provide a combination fly trap and feed trough for animals.

A more specific object of this invention is to provide a cover for a feed trough for animals wherein the cover is coated with a sticky fly catching substance on its upper surface.

Another object of this invention is to provide a combination feed station and fly trap for stock including structure to support a coated fly-trapping cover above the feed station, with the cover in turn supporting flexible stock brushing material therefrom about the feed station.

With the foregoing and other objects in view, the invention resides in the following specification and appended claim, certain embodiments of which are illustrated in the accompanying drawings in which—

FIGURE 1 is a perspective view of one form of the invention, and

FIGURE 2 is a perspective view of a second form of the invention.

The present invention combines two animal instincts. A fly or similar type insect will tend to rise when frightened, and an animal such as a steer or cow will naturally go toward a feed or watering trough. Prior art on fly traps for stock includes such disclosures as Abbott U.S. Patent 1,577,435 and Wright U.S. Patent 1,569,904. While these patents disclose structures for entrapping cattle flies, it is noted that the flies are frightened within the confines of the entire structure upwardly into suitable entrapping means. No allowance is made in this type of prior art for those flies which are frightened away from the animal prior to entering the entrapped area. Also, this prior art does not present the combination given by this invention. Actually, a study of the habits of insects, such as flies, reveals that the mere approach of the animal to an abutment such as the canvas material of Wright is sufficient to scare the fly from the surface of the animal.

The instinct of the fly at the point of leaving the animal is to move upwardly and to alight on the nearest stationary structure. In the present invention, therefore, advantage is taken of the fly's instinct by providing a stationary cover structure for the feed station, with such cover structure being provided with an upper surface coating of a syrupy or generally adhesive nature which will entrap and, if poisonous quickly kill the fly or other insect alighting thereon.

Now, referring more specifically to FIGURE 1, a supporting frame structure generaly indicated at 10 includes a plurality of leg members 11, 12, 13 and 14 connected by a plurality of cross brace members 15 and 16. A pair of longitudinal members 17 and 18 are suitably interconnected with the frame members 15 and 16 and are illustrated as supporting suitable animal feed such as a salt block 19.

Connected by any suitable means to the supstanding end portions of the leg members 11, 12, 13 and 14 is a generally conically shaped cover member 20 which covers the entire frame structure of the device. Connected to the entire peripheral edge of the roof member 20 by suitable means, such as snap fasteners 21 is a plurality of flexible sheets, sheets 22, 23, 24 and 25 being visible in FIGURE 1 and being of such material as canvas for a purpose which will be described. The upper surface of the roof or cover 20 is preferably completely coated with a poisonous, sticky, syrupy material 26. The nature of the material utilized for the coating is immaterial to the invention other than it must be sufficient to entrap an insect such as a fly, and preferably will include an ingredient sufficiently strong to kill a fly within a reasonably short period of time.

In the use of the construction illustrated in FIGURE 1, an animal infested with flies about its head and face, upon desiring a lick of the salt block 19, will push its head past the canvas sheets in order to gain sufficient proximity to the salt block 19 to achieve the purpose. Any flies or other similar insects on the face of the animal will either be frightened by the impending abutment with the canvas, or will in fact be brushed by the canvas from the face and head area of the animal. Upon such happenstance, the insect or fly will rise and normally will alight on the upper surface of the cover member 20, at such time being impounded by the adhesive nature of the coating on the roof. If the coating material is poisonous in nature, then the insect will quickly be exterminated. In such a manner, therefore, the animal by approaching the salt block will achieve two purposes, namely, fulfilling his own taste desire and getting rid of the bothersome flies in the bargain.

Referring to FIGURE 2, it will be observed that the construction is somewhat similar to that of FIGURE 1, but eliminates the use of the canvas in a somewhat different basic structure. In FIGURE 2, a plurality of legs, 27, 28, 29 and 30 are depicted as supporting a feed or watering trough 31. A pair of upstanding legs 32 and 33 are secured by any suitable means, such as nails, to the trough 30. These legs 32 and 33 support a cover member 34 in spaced relationship above and substantially entirely covering the trough 31. The dimensions of the roof 34 are not critical, but it is obviously desirable that they cover more than overly the entire area of the trough beneath. As in FIGURE 1, the roof portion of the structure is completely coated with a fly catching and preferably killing, sticky, or syrupy substance 35. As in FIGURE 1, use of the watering or feed trough by an animal will bring the head of the animal into proximity with the fly catching roof portion thereof. The instinct of the fly or similar insect is such that upon the head of the animal entering the area between the lower edge of the roof and the trough, such insect will be frightened by the impending abutment with the roof portion, will remove itself from the head of the animal and will move upwardly to alight on the nearest stationary structure, in this case, the sticky upper roof portion of the trough or feed station.

It is thus seen that the invention provides a novel combination of an extremely useful nature which takes into account both the eating habits of livestock and the natural instincts of a fly or similar insect to accomplish a dual purpose. Thus, a steer, hog, or the like, will in time realize that upon entering a feed station such as provided by the general structure of FIGURES 1 and 2, he will be able to satisfy his immediate needs as to food or drink, as well as rid himself of the pesky insects.

It is readily realized that there are many structural variations available to the forms of the invention illustrated in FIGURES 1 and 2, and it is intended that obvious variations, falling within the scope of the appended claim which is directed to the combinations of the fly

I claim:

A fly trap for animals comprising the combination of a feed station with a fly catching means, said means including a cover having an upper surface for the feed station, said cover spaced from said station and including a coating of sticky material on the upper surface, said cover supporting flexible material about said feed station against which an animal's head will brush when entering the station.

References Cited in the file of this patent

UNITED STATES PATENTS

| | | |
|---|---|---|
| 1,176,961 | Henning | Mar. 28, 1916 |
| 1,560,683 | Foley | Nov. 10, 1925 |
| 1,723,919 | Bykowy | Aug. 6, 1929 |
| 2,273,616 | Beatty | Feb. 17, 1942 |
| 2,283,812 | Kohinka | May 19, 1942 |
| 2,777,421 | Hiebert | Jan. 15, 1957 |

FOREIGN PATENTS

| | | |
|---|---|---|
| 349,560 | Germany | Mar. 4, 1922 |